(12) United States Patent  (10) Patent No.: US 8,161,740 B2
Krause et al.  (45) Date of Patent: Apr. 24, 2012

(54) FORCE TRANSMISSION DEVICE WITH A ROTATIONAL SPEED ADAPTIVE DAMPER AND METHOD FOR IMPROVING THE DAMPING PROPERTIES

(75) Inventors: Thorsten Krause, Bühl (DE); Dominique Engelmann, Offendorf (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 12/800,961

(22) Filed: May 26, 2010

(65) Prior Publication Data
US 2010/0242466 A1 Sep. 30, 2010

Related U.S. Application Data (63) Continuation of application No. PCT/DE2008/001901, filed on Nov. 17, 2008.

(30) Foreign Application Priority Data

Nov. 29, 2007 (DE) .......................... 10 2007 057 447

(51) Int. Cl.
*F16D 43/18* (2006.01)
*F16F 15/14* (2006.01)

(52) U.S. Cl. ........................................ 60/338; 192/30 V
(58) Field of Classification Search ................... 60/338; 192/30 V
See application file for complete search history.

(56) References Cited

U.S. PATENT DOCUMENTS 6,026,940 A * 2/2000 Sudau .......................... 192/3.28
6,450,065 B1 * 9/2002 Eckel et al. .................. 74/574.4

FOREIGN PATENT DOCUMENTS

| DE | 198 04 227 A1 | 8/1999 |
| DE | 102 36 752 A1 | 2/2004 |
| DE | 10 2004 004 176 A1 | 8/2005 |
| EP | 1744074 A2 * | 1/2007 |

* cited by examiner

*Primary Examiner* — Thomas E Lazo
(74) *Attorney, Agent, or Firm* — Von Rohrscheidt Patents (57) ABSTRACT

The invention relates to a force transmission device for power transmission between an input and an output, comprising at least an input and an output, and a vibration damping device disposed in a cavity that can be filled at least partially with an operating medium, in particular oil, the vibration damping device coupled with a rotational speed adaptive absorber, wherein the rotational speed adaptive absorber is tuned as a function of an oil influence to an effective order $q_{eff}$, which is greater by an order shift value $q_F$ than an order q of an exciting vibration of a drive system.

13 Claims, 5 Drawing Sheets

FORCE TRANSMISSION DEVICE WITH A ROTATIONAL SPEED ADAPTIVE DAMPER AND METHOD FOR IMPROVING THE DAMPING PROPERTIES

RELATED APPLICATIONS

This patent application is a continuation of International patent application PCT/DE 2008/001901 filed on Nov. 17, 2008 claiming priority from and incorporating by reference German patent application DE 10 2007 057 447.0, filed on Nov. 29, 2007.

FIELD OF THE INVENTION

The invention relates to a force transmission device, in particular for power transmission between a drive engine and an output, the device including a hydrodynamic component and a vibration damping device with a rotational speed adaptive absorber. The invention furthermore relates to a method for improving the damping properties of such force transmission devices.

Force transmission devices in drive trains between a drive engine and an output are known in the art in various configurations. When an internal combustion engine is used as a drive engine, a rotation occurs at the crankshaft, which superimposes the rotating motion, wherein the frequency of the rotation changes with the rotational speed of the shaft. Absorber assemblies are being used in order to reduce the rotation. These include an additional mass that is coupled to the oscillating system through a spring system. The operation of the tuned mass vibration damper is based on the primary mass remaining stationary at a particular excitation frequency, while the additional mass performs a forced oscillation. Since the excitation frequency varies with the speed of rotation of the drive engine, while the resonance frequency of the damper remains constant, the tuned mass damping effect, however, only occurs at a particular speed of rotation. An assembly of this type is e.g. known from the printed document DE 102 36 752 A1. In this printed document, the drive engine is connected with one or plural transmission components through at least one startup element, in particular a clutch or a hydrodynamic speed-/torque converter. Thus, a vibration capable spring-mass system is not connected in series with the drive train, but is connected in parallel therewith, which does not degrade the elasticity of the drive train. This vibration capable spring-mass system functions as a absorber. The absorber is associated with the converter lockup clutch in a particularly advantageous embodiment in order to prevent possible force spikes when the converter lockup clutch closes. According to another embodiment, it is furthermore provided to connect a torsion damper with two torsion damper stages after the startup element, wherein the torsion damper is disposed in the force flow of the drive train. Thus, the spring-mass system is disposed between the first torsion damper stage and the second torsion damper stage, which is intended to yield particularly favorable transmission properties. The spring-mass system can have a variable resonance frequency in a broader frequency band, wherein the resonance frequency can be influenced through a control- or regulation system.

Furthermore, a force transmission device is known from the printed document DE 197 81 582 T1, which includes a hydrodynamic clutch and a device for locking up the hydrodynamic clutch, wherein a mechanical assembly is provided, which is used for controlling the relative rotation between the input- and output device for the power transmission device.

In order to dampen the effect of an excitation over a broad, preferably the entire, rotational speed range of a drive engine, tuned mass vibration dampers that can be adapted to a rotational speed are provided in the drive trains according to DE 198 31 160 A1, wherein the tuned mass vibration dampers can dampen rotational vibrations over a larger rotational speed range, ideally over the entire rotational speed range of the drive engine, in that the resonance frequency is proportional to the rotational speed. The tuned mass vibration dampers operate according to the principle of a circular- or centrifugal force pendulum in a centrifugal force field, which is already used in a known manner for damping crankshaft vibrations for internal combustion engines. For this type of pendulum, inertial masses are supported about a rotation axis, so they can perform a pendulum type motion, which inertial masses tend to rotate about the axis of rotation at the largest distance possible, when a rotating movement is initiated. The rotational vibrations cause a pendulum type relative movement of the inertial masses. Thus, different systems are known, in which the inertial masses move relative to the torque input axis in a purely translatoric manner on a circular movement path, or according to DE 198 31 160 A1 on a movement path that has a curvature radius that varies at least in sections for an increasing displacement of the inertial mass from the center position.

A startup unit including a hydrodynamic speed-/torque converter and a device for bridging the power transmission through the hydrodynamic speed-/torque converter is known from the printed document DE 199 26 696 A1. It includes at least one additional mass, whose center of gravity can be moved under the influence of a centrifugal force in a radial direction as a function of a relative position of the transmission elements with reference to a rotation axis of the torque transmission path.

A torque transmission device in a drive train of a motor vehicle for torque transmission between a drive engine and an output is known from the printed document DE 10 2006 08 556 A1, wherein the torque transmission device includes at least one torsion vibration damper device in addition to an actuatable clutch device. A centrifugal pendulum device is associated with the torsion vibration damper device, wherein the centrifugal pendulum device includes plural pendulum masses which are linked to the pendulum mass support device by means of support rollers, so that they are movable relative to the pendulum mass support device.

Embodiments of force transmission devices, hydrodynamic components and integrated devices for damping vibrations with a absorber, which can be adjusted to a speed of rotation, are also already known in the art. However, it has become evident that the insulation effect, which is actually intended, with the placement of the damper, which can be adjusted to a rotational speed, is not sufficiently achieved.

BRIEF SUMMARY OF THE INVENTION

Thus, it is an object of the invention to configure a force transmission device as recited supra, in particular a force transmission device with a hydrodynamic component, and at least a device for damping vibrations with a rotational speed adaptive absorber, so that rotational variations can be absorbed in an optimum manner over a wide range of rotational speeds. Thus, optimum driving properties, in particular high driving comfort, can be assured through the transmission properties of the force transmission device over the entire operating range of such force transmission devices, operating together with a drive engine, in particular when used in drive trains for vehicles.

The solution according to the invention is characterized by the features including: at least an input (E) and an output (A), and a vibration damping device disposed in a cavity that can be filled at least partially with an operating medium, in particular oil, the vibration damping device coupled with a rotational speed adaptive absorber, wherein the rotational speed adaptive absorber is tuned as a function of an oil influence to an effective order $q_{eff}$, which is greater by an order shift value $q_F$, than an order q of an exciting vibration of a drive system and/or the cavity in particular flowed through by an operating medium of a hydrodynamic component. Advantageous embodiments include, individually and in combination, the features: the order shift value $q_F$ is selected, so that a resonance of the rotational speed adaptive absorber does not coincide with the order q of the exciting vibration; the effective order $q_{eff}$ of the rotational speed adaptive absorber exceeds the order q of the exciting vibration of the drive by the order shift value $q_F$ in the range of >0.05 to 0.5, preferably >0.05 to 0.4, particularly preferably >0.05 to 0.3, most preferably 0.14 to 0.3; the rotational speed adaptive absorber is configured as a centrifugal force pendulum device, comprising an inertial mass support device with inertial masses disposed thereon and movable relative thereto, configured and designed, so that a center of gravity distance S of a particular inertial mass is determined as a function of an order q of the exciting vibration of the drive and the order shift by $q_F$ to an effective order $q_{eff}$ defines a change of the center of gravity distance as a function of the order shift value $q_F$; a size of the order shift value $q_F$ changes proportional to a change of the order q of the excitation of the drive; a hydrodynamic component with at least a primary shell functioning as a pump shell (P) and a secondary shell functioning as turbine shell (T) jointly forming an operating space (AR), wherein the turbine shell (T) is connected at least indirectly torque proof with the output (A) of the force transmission device and a device for bridging the hydrodynamic components, which are respectively disposed in a power path, and the device for damping vibrations is connected with the rotational speed adaptive absorber at least in series with one of the power paths, wherein a cavity which can be at least partially filled with an operating medium, in particular oil, is formed by an inner cavity of the force transmission device which inner cavity is flowed through by the operating medium of the hydrodynamic component. Advantageous method embodiment may also include determining the order of excitation q of a drive engine, defining a geometry of the rotational speed adaptive absorber for the order of excitation q, determining the required order shift value $q_F$, and determining the geometry of the absorber as a function of the order shift value $q_F$.

A force transmission device according to the invention for power transmission between an input and an output with at least one input and one output, and a vibration damping device disposed in a cavity that can be filled with an operating medium, in particular oil, the vibration damping device coupled with a rotational speed adaptive absorber, wherein the rotational speed adaptive absorber is configured as a function of an oil influence, in particular the oil influence in its ambient, to be tuned with respect to its geometric configuration to an effective order $q_{eff}$, which is greater by an order shift value $q_F$, than the order q of the exciting oscillation of the drive system.

Thus, a rotational speed adaptive absorber according to the invention is a device which does not transfer torque, but which is configured to absorb excitations over a very broad range, preferably the entire rotational speed range of a drive engine. The resonance frequency of a rotational speed adaptive absorber is proportional to a rotational speed, in particular to a rotational speed of an exciting engine.

By shifting the order, the influence of the rotating oil upon the particular inertial mass, which influence leads to a shifting of the order of the absorber to a lower order, is also considered and preferably completely compensated, so that the effectively acting centrifugal force compared to embodiments without oil rotating during operation is unchanged and the desired isolation of the variations of rotational speed in the excitation order of the drive engine is completely assured. No complex control measures are required; the absorber is only configured with respect to its geometry for an order which is increased by the order shift value. Thus, the geometric tuning order does not correspond to the tuning order of the excitation like in prior art embodiments, but it corresponds to a value which is higher by the order shift value.

The order shift value $q_F$ is selected, so that the resonance of the rotational speed adaptive absorber does not coincide with the order q of the exciting vibration. The order shift value considers the effect of the oil in oil filled cavities under centrifugal forces upon the absorber, which is not negligible. The effective order $q_{eff}$ of the rotational speed adaptive absorber thus exceeds the order q of the exciting oscillation of the drive by the order shift value $q_F$. It is located in a range of >0.05 to 0.5, preferably >0.05 to 0.4 particularly preferably >0.05 to 0.3, most preferably 0.14 to 0.3. These ranges are thus outside of the tolerance field with respect to the precision of the components and cause an evident and effective order shift.

The rotational speed adaptive absorber is configured and tuned as a centrifugal force pendulum device comprising an inertial mass support device with inertial masses disposed moveably thereon and relative thereto, so that the center of gravity distance S of a particular inertial mass is determined as a function of the order q of the exciting oscillation of the drive. Through the order shift value $q_F$ which leads to a modified geometric configuration of the tuned mass temper to a higher order value compared to the prior art, the absorber is characterized by a modified center of gravity distance. This effective center of gravity distance $S_{eff}$ of the particular inertial mass describes a displacement of the center of gravity by an amount which results from the order shift value, this means it corresponds to the sum of the center of gravity distance for the same geometric conditions and the identical configuration without consideration of the oil influence and of the deviation resulting from considering the rotating oil.

For a known geometric shape of the rotational speed adaptive absorber, at least the effective radius of the center of gravity path and the effective radius of the center of the center of gravity path center can be determined as a function of the effective center of gravity distance $S_{eff}$.

The rotational speed adaptive absorber can thus be configured as a dual string pendulum or as a roller pendulum with inertial masses that are supported by support rollers, wherein the path radius $R_{eff}$ of the support rollers can be determined for a known geometric shape of the rotational speed adaptive absorber from the effective center of gravity distance $S_{eff}$ as a function thereof.

For a drive with an excitation in the 2nd order, e.g. a four cylinder internal combustion engine preferably an order shift value $q_F$ of approximately 0.14 is selected. When the order of the excitation changes, e.g. by changing the drive engine into a 6-cylinder internal combustion engine, the amount of the order shift value $q_F$ changes in proportion to the change of the order q of the excitation of the drive.

BRIEF DESCRIPTION OF THE DRAWINGS

The solution according to the invention is subsequently described with reference to figures, wherein.

DETAILED DESCRIPTION OF THE INVENTION

Figure 1A:
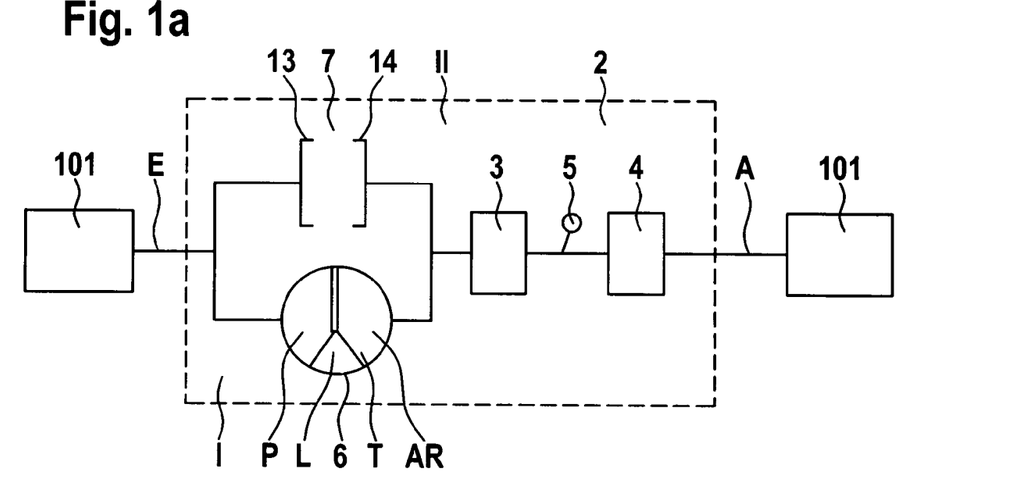
FIG. 1a illustrates an embodiment of a force transmission device according to the invention in a simplified schematic depiction.

FIG. 1a illustrates the basic configuration of a force transmission device 1 configured according to the invention for power transmission in drive trains, in particular in drive trains for vehicles in a simplified schematic view. Thus, the force transmission device 1 is used for power transmission between a drive engine 100 which can be configured e.g. as a combustion engine and an output 101. The force transmission device 1 thus comprises at least one input E and at least one output A. The input E is thus connected to the drive engine 100 at least indirectly. The output A is connected at least indirectly with the units 101 to be driven e.g. configured as a transmission. "At least indirectly" thus means that the coupling can either be performed directly, this means without additional transmission elements disposed there between, or indirectly through additional transmission elements. The terms "input" and "output" are to be interpreted from a functional point of view in force flow direction from a drive engine to an output and they are not limited to a particular design configuration.

The damper assembly 2 includes at least two dampers 3 and 4 which can be connected in series and form damper stages, and a rotational speed adaptive absorber 5. A rotational speed adaptive tuned mass temper 5 is thus interpreted as a device for absorbing variations in rotational speed, wherein the device does not transmit power, but is configured to absorb rotational vibrations over a larger range of rotational speeds, preferably the entire range of rotational speeds, in that inertial masses are caused to rotate about a torque induction axis at a maximum distance. The rotational speed adaptive absorber 5 is thus formed by a centrifugal force pendulum device. The resonance frequency of the absorber 5 is proportional to the rotational speed of the exciting unit, in particular the drive engine 100. The superposition of the rotating movement through rotational vibrations causes a pendulum type relative movement of the inertial masses. According to the invention, the rotational speed adaptive absorber 5 is connected in the force flow in at least one of the theoretically possible force flow directions viewed over the damper assembly 2 between the two dampers 3 and 4 of the damper assembly 2. Besides damping vibrations through the particular dampers 3 and 4, the rotational speed adaptive absorber 5 thus operates at different frequencies.

For the damper assemblies and the connections in force flow directions with plural components there is a plurality of options. Thus, in particular for embodiments with a hydrodynamic component 6 and a device 7 for bridging the hydrodynamic component a differentiation is made between embodiments with a series connection of the dampers 3 and 4, or at least for a power transmission through one of the components with a series connection as elastic clutches and for a power transmission through other components with one damper 3 or 4 operating as an elastic clutch and the other damper operating as a absorber. FIG. 1a illustrates a particularly advantageous embodiment of the force transmission device 1 with a damper assembly 2 with an integrated rotational speed adaptive absorber 5, comprising at least one hydrodynamic component 6 and a device 7 for at least partially bypassing the force transmission through the hydrodynamic component 6. The hydrodynamic component 6 comprises at least one primary shell functioning as a pump shell P when coupled with the input E for a force flow direction from the input E to the output A and a secondary shell functioning as a turbine shell T which is at least indirectly coupled torque proof with the output A, when power is transmitted from the input E to the output A, wherein the shells form an operating cavity AR. The hydrodynamic component 6 can be configured as a hydrodynamic clutch which operates with speed conversion or in a particularly advantageous embodiment it can be configured as a hydrodynamic speed-/torque converter, wherein the power transmission through the hydrodynamic speed-/torque converter always simultaneously causes a torque and moment conversion. In this case the hydrodynamic component 6 includes at least another so called stator shell L, which can be supported either fixed in place or rotatable depending on the embodiment. The stator shell L can furthermore be supported through a freewheeling clutch. The hydrodynamic component 6 is thus disposed between the input E and the output A. This describes a first power path I in the force flow between the input E and the output A, viewed over the hydrodynamic component 6. The device 7 for circumventing the hydrodynamic component 6 is preferably configured as a so called lock up clutch which can be an actuatable clutch device in the simplest case. It can be configured as a synchronously actuatable clutch or clutch device. The clutch device is also disposed between the input E and the output A and defines a second power path II with mechanical power transmission when power is transmitted through the clutch device. Thus, the damper assembly 2 is connected after the device 7 viewed in force flow direction from the input E to the output A and also connected after the hydrodynamic component 6. Thus, the rotational speed adaptive absorber 5 is connected subsequent to the hydrodynamic component 6 and also subsequent to the mechanical clutch viewed in force flow direction from the input E to the output A. This is accomplished in that the rotational speed adaptive absorber 5, which is configured as a centrifugal force pendulum, is connected at least indirectly torque proof with the secondary shell of the hydrodynamic component 6, the secondary shell functioning as a turbine shell T in at least one operating condition.

Figure 1B:
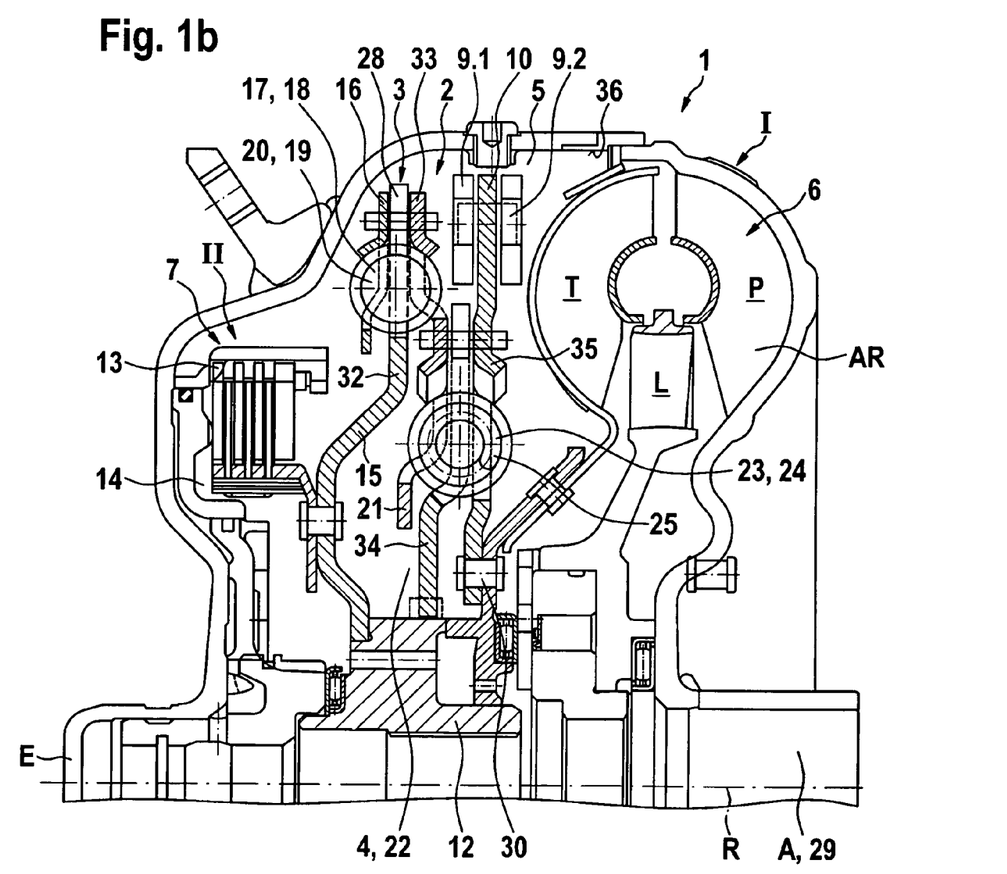
FIG. 1b illustrates a particularly advantageous embodiment of a force transmission device according to the invention with reference to an axial sectional view.
Figure 2:
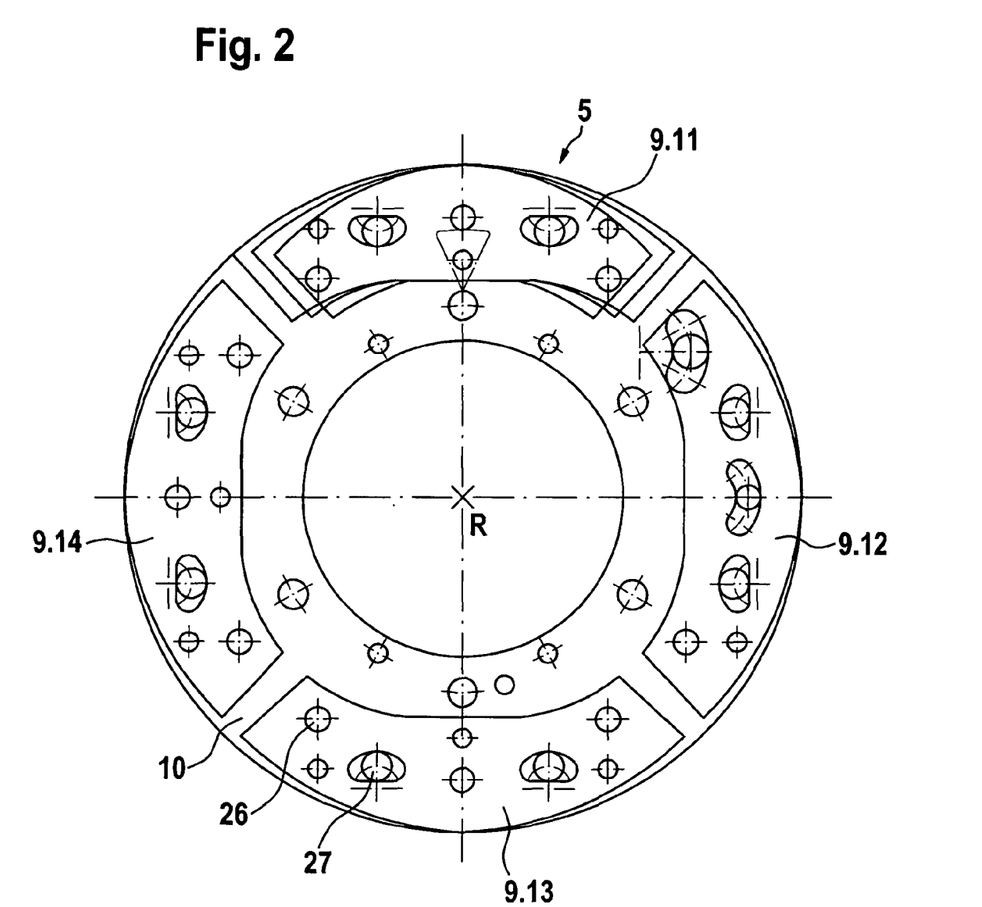
FIG. 2 illustrates an embodiment of a rotational speed adaptive absorber in a view from the right.

FIG. 1a illustrates a first embodiment of a force transmission device 1 with a rotational speed adaptive absorber 5, which is located between two dampers 3 and 4 which can be connected in series, wherein the dampers 3 and 4 are connected in series at least in one of the force flow directions, herein they are connected in series in both force flow directions and operate as vibration damping devices, this means quasi as an elastic clutch, regardless how the particular dampers 3 and 4 are actually configured. FIG. 1b, on the other hand illustrates another force transmission device configured according to the invention, wherein, however, herein the two dampers 3 and 4 are respectively only connected in series in their function as an elastic clutch in one force flow direction in a power path I or II. According to FIG. 1b, thus the assembly comprised of the two dampers 3 and 4 connected in series in the force flow is always connected after the mechanical power path II, viewed in the force flow direction between the input E and the output A, and both dampers 3, 4 act as an elastic clutch, while the first damper 3 acts as a absorber in the hydrodynamic power path.

FIG. 1b illustrates a particularly advantageous embodiment with an integrated configuration of the rotational speed adaptive absorber for the damper assembly 2 with a high functional concentration. The rotational speed adaptive absorber 5 is configured as a centrifugal force pendulum device 8 and comprises one, preferably plural inertial masses which are supported at an inertial mass support device 10, so they are movable relative to the inertial mass support device. Thus, the support is performed e.g. through support rollers 11.

The output A is formed herein e.g. by a shaft 29 which is only indicated which can be simultaneously formed by a transmission input shaft when used in drive trains for motor vehicles, or it is formed by an element which can be coupled torque proof with the input shaft, in particular a hub 12. The hub 12 is also designated as damper hub. The coupling of the turbine shell T with the output A is thus performed through the damper assembly 2, in particular the second damper 4. The damper assembly 2 includes two dampers 3 and 4 which can be connected in series and which form a damper stage respectively and the two damper stages are disposed offset relative to one another in radial direction and thus form a first outer and a second inner damper stage. The dampers 3 and 4 are configured herein as singular dampers; however, it is also conceivable to configure them as series or parallel dampers. Thus, advantageously in order to implement the space and installation space saving embodiment, the first radial damper stage is configured as a radially outer damper stage, this means it is disposed on a larger diameter than the second radially inner damper stage. The two dampers 3 and 4 or the damper stages formed thereby are connected in series in the form of a lock up clutch in the force flow between the input E and the output A viewed over the device for circumventing the hydrodynamic component 6. The bridging device 7 configured as a lock up clutch, thus comprises a first clutch component 13 and a second clutch component 14 which can be brought into operative engagement with one another at least indirectly, this means directly or indirectly through additional transmission elements. The coupling is thus performed through friction pairings which are formed by the first and second clutch components 13 and 14. The first clutch component 13 is thus at least connected indirectly torque proof with the input E, preferably connected directly with the input, while the second clutch component 14 is coupled at least indirectly torque proof with the damper assembly 2, in particular with the first damper 3, preferably directly coupled with the input of the first damper 3. The first and the second clutch component 13 and 14 comprise an inner disc packet and an outer disc packet in the illustrated case, wherein for the configuration illustrated herein, the inner disc packet is comprised of inner discs which are supported in axial direction at an inner disc support and which form surface portions which are oriented in axial direction which can be brought in operative engagement with the surface portions complementary thereto at the outer discs disposed at the outer disc support of the first clutch component 13. At least a portion of the inner discs and a portion of the outer disc is thus moveably supported in axial direction at the respective disc support. The second clutch component 14 is thus coupled with a component functioning herein as an input component of the damper 3 in force flow direction from the input E to the output A. This component is, for example, designated as primary component 15. The first damper 3 furthermore comprises a secondary component 16, wherein the primary component 15 or the secondary component 16 are coupled with one another through torque transfer devices 17 and damping coupling devices 18, wherein the damping coupling devices 18 are formed by torque transmission devices 17 and in the simplest case by elastic elements 19, in particular spring units 20. The primary component 15 and the secondary component 16 are thus rotatable relative to one another in circumferential direction within limits. Analogously, this applies also applies the second damper 4, which is configured herein as radially inward disposed damper and thus as inner damper. It also comprises a primary component 21 and a secondary component 22 which are coupled with one another through torque transmission devices 23 and damping coupling devices 24, wherein the primary component 21 and the secondary component 22 are disposed coaxial relative to one another and are rotatable relative to one another within limits in circumferential direction. Also here, the torque transmission devices 23 can be formed by damping coupling devices 24 or they can be functionally integrated into one component, preferably in the form of spring units 25. The primary components and the secondary components 15, 16 or 21 and 22 of the two dampers 3 and 4 can thus be configured integral or in several components. Advantageously, one respective damper of the two dampers is configured from two disc elements coupled with one another torque proof, between which the respective other component, the secondary component 22 or the primary component 21 is disposed.

In the illustrated case the respective primary components 15 or 21 function as input components for a power transmission between the input E and the output A, while the secondary components 16 or 21 function as output components for the respective damper 3, 4. The input component, and thus the primary component 15 of the first damper 3 is formed by a disc shaped element in the form of a drive flange 32. The output component 16 is formed by two disc shaped elements which are also designated as drive discs 33, which are disposed in axial direction on both sides of the primary component 15 and coupled torque proof with one another. Thus, the secondary component 16 of the first damper 3 is connected torque proof with the primary component 21 of the second damper 4 or forms a unit therewith, wherein also an integral configuration between the primary component 21 and the secondary component 16 is possible. The primary component 21 of the second damper 4 is formed herein by two disc shaped elements which are designated as drive discs 35, while the secondary component 22 is formed by a disc shaped element disposed in axial direction between the drive discs, in particular a flange 34, this means an intermediary disc which is connected torque proof with the output A, here in particular the hub 12. The primary component 21 of the second damper 4 is furthermore connected torque proof with the turbine shell T, in particular with the secondary shell of the hydrodynamic component 6. The coupling 30 is provided here in the simplest case through friction locked or form locked connections. In the illustrated case a connection is selected which is configured as a riveted connection, wherein the rivets can either be provided as extruded rivets or as separate rivets.

The rotational speed adaptive absorber 5 is at least partially a component of an element of the damper assembly 2, in particular of the primary component 21 of the second damper 4. In this embodiment at least a drive disc 35 of the primary component 21 and the inertial mass support device 10 form a unit, or they are formed by a component. Thus, the drive disc 35 is extended in radial direction in the direction towards the inner circumference 36 and extends with its extension into the portion of the outer circumference 28 of the first damper 3 in radial direction or beyond. Thus, In particular for the configuration of the two dampers 3 and 4 illustrated in FIG. 1b with an offset in axial direction and in radial direction, the gained installation space or the available installation space can be utilized in an optimum manner.

Figure 4:
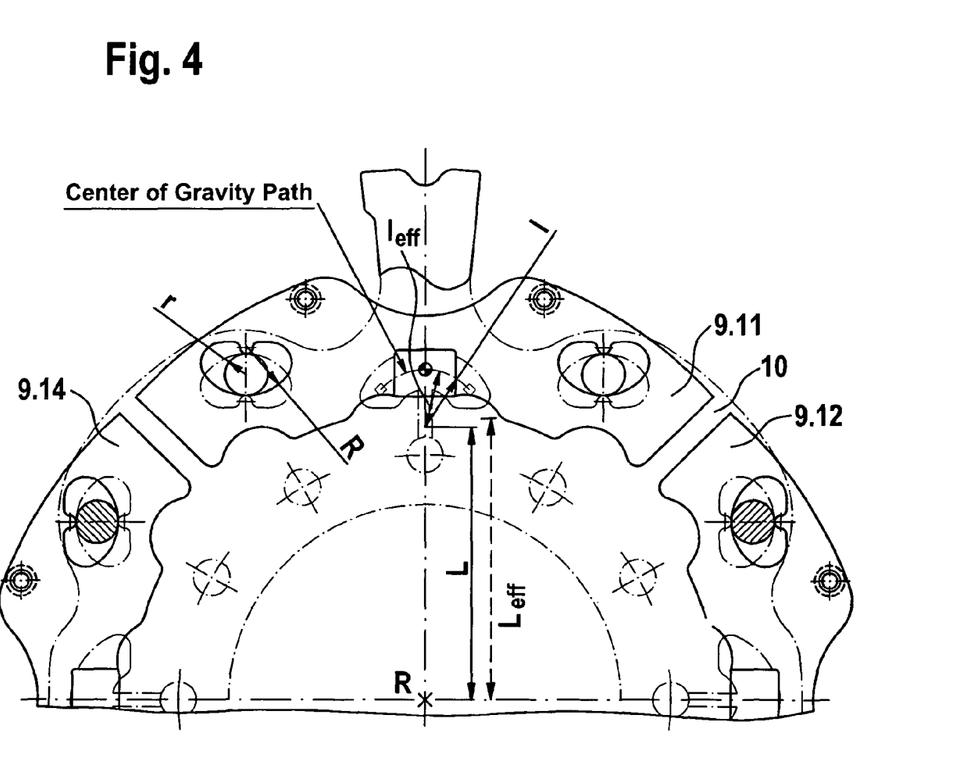
FIG. 4 illustrates the characteristic geometric variables for a rotational speed adaptive absorber in a detail of a view from the right.

The embodiments for a rotational speed adaptive absorber can be configured in many ways. Reference is made among others to the printed documents DE 10 2006 028 556 A1 and DE 198 31 160 A1. The disclosure of these printed documents with respect to the configuration of rotational speed adaptive tuned mass vibration dampers is thus incorporated by reference into the instant patent application in its entirety. Tuned mass vibration dampers can be adapted to a rotational speed, when they can absorb rotational vibrations over a large rotational speed range, ideally over the entire speed range of the drive engine. The inertial masses 9.1, 9.2 thus tend to move on the largest possible radius relative to the torque induction axis due to centrifugal forces. Through the superposition of the rotational movement with the rotational vibrations a pendulum type relative movement of the inertial masses 9.1, 9.2 is induced. They assume their positions solely based on centrifugal force or their weights. This applies also for the resetting. There is no separate resetting force. Furthermore, the resonance frequency is proportional to the rotational speed, so that the rotational vibrations with frequencies which are proportional to the rotational speed n of the shaft in the same way can be absorbed over a large rotational speed range. Thus, for the absorbers 5 the inertial masses 9.1, 9.2 move relative to the hub component in a purely translatoric manner on a circular movement path. An embodiment is known from the printed document DE 198 31160 A1 in which the movement path is e.g. furthermore characterized by a curvature radius which changes at least in sections for an increasing displacement of the inertial masses 9.1, 9.2 from a center position. This applies also for the embodiment of DE 10 2006 028 556 A1. An embodiment of this type is depicted in FIG. 4 in a lateral view in an exemplary manner as an embodiment for a absorber 5, which can be adapted to a rotational speed. This is an exemplary embodiment. Other embodiments are conceivable. A configuration of an annular disc shaped element as an inertial mass support device 10 is illustrated herein as well as the particular inertial masses 9.1-9.n disposed thereon evenly distributed in circumferential direction. In the illustrated case four inertial masses in the form of pendulum masses 9.11-9.14 are moveably supported. These masses are moveably supported at the pendulum mass support device 10 through jacketed shoulder bolts 26 and through support rollers 27.

The rotational speed adaptive absorber 5 according to the invention is designed and configured, so that its geometric tuning order does not directly correspond to the excitation order of the drive engine even considering tolerances, but so that the absorber is moved towards a higher order, this means that it is designed for a higher order, than the order q of the excitation, wherein the configuration is selected, so that the excitation order of the engine does not coincide with the resonance of the centrifugal force pendulum in the operating condition. This is performed through an order shift by an order shift value $q_F$.

Figure 3:
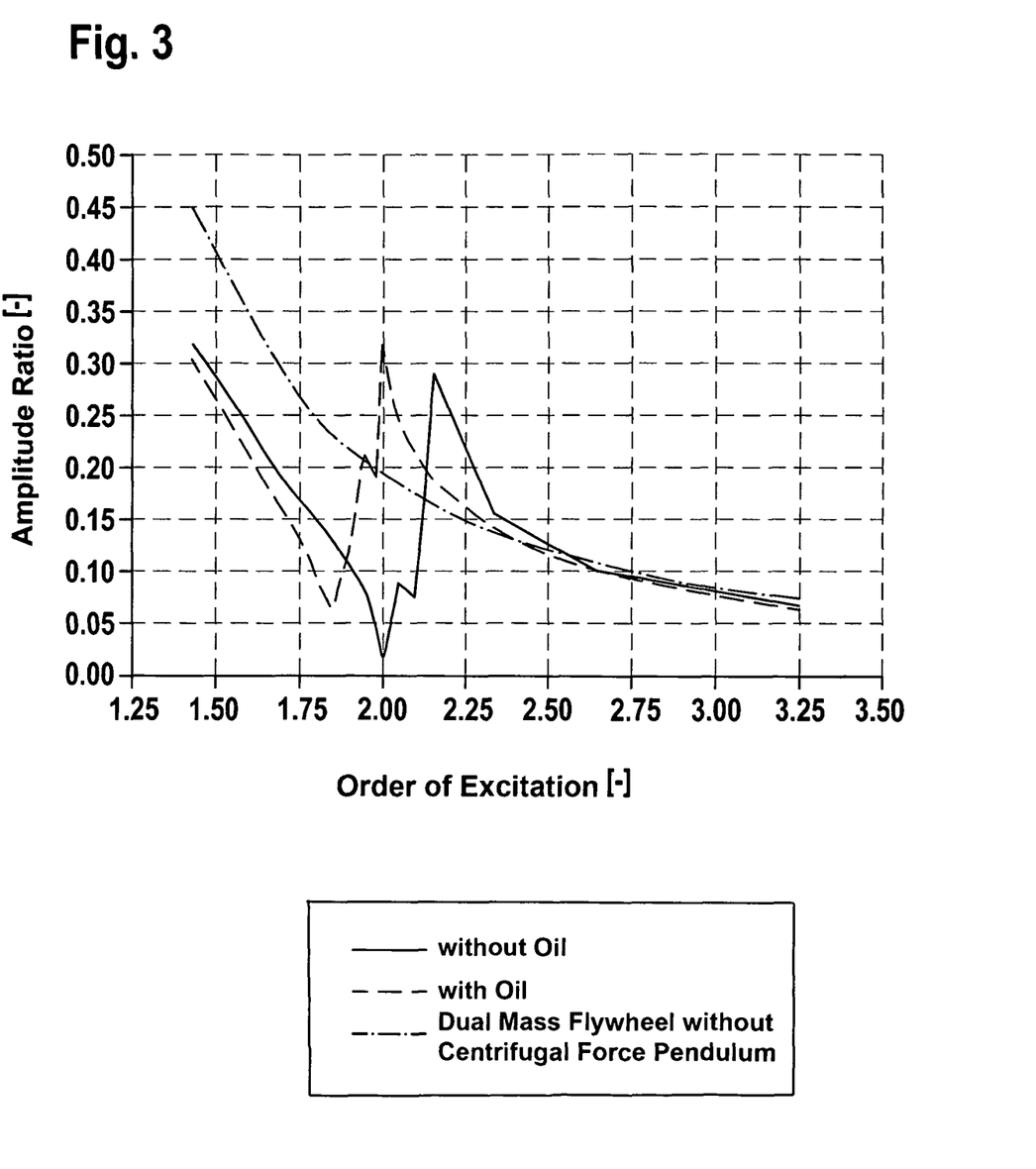
FIG. 3 illustrates the effect of a prior art damper with a rotational speed adaptive absorber with reference to a diagram.

When there is no order shift, but the rotational speed adaptive absorber 5 is configured for the order q of the excitation through the drive engine, this corresponds e.g. to the second order for an internal combustion engine with four cylinders. For a force transmission device 1 in which the device for damping vibrations, in particular the damper assembly 2 is disposed in a space which is free of operating medium, which is free in particular from a rotating oil ring during operation, when the force transmission device 1 rotates, this yields the curve illustrated with a solid line in the diagram of FIG. 3. On the other hand, the insulation of the rotational speed adaptive absorber 5 is illustrated through a dashed line under the influence of the oil in the hydrodynamic component 6 for the same configuration. From this it is evident that a shift of the order of the absorber 5 with the same configuration occurs under oil to lower order values, wherein the resonance of the absorber 5 coincides in the least favorable case with the order of excitation of the engine, in this case the second order. The properties of a dual mass flywheel without a rotational speed adaptive absorber 5 are furthermore illustrated through a dashed dotted line.

The Inventors have found that in force transmission devices with hydrodynamic components which are flowed through by an operating medium during operation, in particular oil, either in a centrifugal direction or in a centripetal direction, no matter if a power transmission is performed through the hydrodynamic components or not, the oil of the rotating oil masses has a significant effect upon the function of the absorber 5, in particular of the centrifugal force pendulum. Thus, in particular a relative movement occurs between the inertial mass and the rotating oil. The order shift of the geometric tuning order to a higher order value which order shift corresponds to the shift of the absorption order about the order movement value $q_F$ considers the effect which comes from the oil influence which counteracts the centrifugal force.

The tuned mass vibration damper generally has a resonance frequency $f_{0\ absorber}$ which is proportional to a rotational speed, in particular the rotational speed n of the excitation, so that rotational vibrations with frequencies which are proportional in the same manner to the rotational speed of the shaft can be absorbed over a large range of rotational speeds. Thus $f_{0\ asorber}=q^*n$ applies, wherein q represents the order. This yields for example the value q=2 for a periodically operating drive engine, which is configured as a four cylinder engine. For engines with several cylinders for which a total operating cycle can be described in a 360° through the number of the movements at the particular cylinder piston units, the order of excitation corresponds to the number N of the cylinders divided by 2.

Furthermore the following applies for the absorber assembly:

$$q = \sqrt{\frac{L}{l}}$$

and for the absorption frequency:

$$f_T = f_0 = q \cdot \frac{\omega}{2 \cdot \pi}$$

This yields the following equation for small oscillation angles:

$$f_0 = \frac{\omega}{2 \cdot \pi} \cdot \sqrt{\frac{L}{l}}$$

ω=angular rotational speed
$f_0$=resonance frequency
L=distance of linking of inertial mass from the rotation axis and thus from the torque induction axis l=distance of the inertial mass from the linking point, in particular pendulum length.

When the rotational speed adaptive absorber 5 is to be configured, in particular for an arrangement in a force transmission device 1 with a hydrodynamic component, either a hydrodynamic clutch, or a hydrodynamic speed-/torque converter in a cavity filled with oil, the order shift has to be considered. The order shift is designated as $q_F$. This yields the order to be effectively adjusted and to be effectively configured $q_{eff}=q+q_F$. According to the invention it is adjusted in a range between 0.05 and 0.5. The order shift $q_F$ can thus be defined as a freely selectable value, or it can be predetermined respectively as a fixed value for the particular orders of the excitation.

The knowledge of these contexts facilitates an optimum configuration of the rotational speed adaptive absorber 5. Thus, a desired absorption order q is predetermined. From this absorption order the resulting effective order $q_{eff}$ which considers the oil influence can be determined for a known geometric shape of the rotational speed adaptive absorber. The effective center of gravity distance $S_{eff}$ for an area segment can be determined as a function of the effective order. This yields the particular geometric variables for the embodiment according to FIG. 4 according to the following equations:

Effective radius of center of gravity path:

$$l_{eff} = \frac{S_{eff}}{q_{eff}^2 + 1}$$

Effective radius of center of center of gravity path:

$$L_{eff} = S_{eff} - l_{eff}$$

Path radius of rollers:

$$R_{eff} = \frac{l_{eff}}{2} - r$$

In order to achieve the desired insulation of the rotational speed adaptive absorber in oil, for example, in a hydrodynamic component, the absorber has to be configured for a higher order, this means the shift of the absorption order through the oil, in particular through the oil pressure and the forces resulting there from have to be considered for the configuration as well. Since the shift of the absorption order through the oil can be expressed as a movement of the center of gravity of the inertial masses or pendulum masses, the shift through the oil can be substantially compensated by changing the geometry of the inertial masses and the geometry of their centers of gravity.

The method according to the invention can be implemented as described infra: Initially, the order of the excitation is determined in a first step. It is essential that a shift to a higher order is selected as a function of the order of the excitation as a starting point, wherein the shift is in a range of 0.05-0.5, wherein the configuration is based on the respective ideal conditions of a dry centrifugal force pendulum during an operating mode with the system operative. Thus an order shift is predetermined which is disposed in a range of 0.05-0.5. As a function of the order shift the connection and thus the center of gravity path is determined considering the oil influence, while the geometry of the inertial masses 9.11-9.14 is known. This yields the effective center of gravity distance $S_{eff}$ where the center of gravity is subsequently linked. This yields the additional required geometric variables, like the effective radius of the center of gravity path, effective radius of the center of the center of gravity path and the path radius of the support rollers. The center of gravity path can thus be configured, so that it differs from a circular path.

Reference Numerals and Designations

1 force transmission device
2 damper assembly
3 damper
4 damper
5 rotational speed adaptive absorber
6 hydrodynamic component
7 lock up device for hydrodynamic component
8 centrifugal force pendulum
9 inertial mass
9.1, 9.2, 9.11
9.12, 9.13, 9.14 inertial mass
10 inertial mass support device
11 support rollers
12 hub component
13 first clutch component
14 second clutch component
15 primary component
16 secondary component
17 torque transmission device
18 damping coupling device
19 elastic element
20 spring unit
21 primary component
22 secondary component
23 torque transmission device
24 damping coupling device
25 spring device
26 shoulder bolt
27 support roller
28 outer circumference
29 shaft
30 coupling
31 drive flange
32 drive discs
33 drive flange
34 drive discs
35 inner circumference
36 outer circumference
100 drive engine
101 output
E input
A output
P pump shell
T turbine shell
AR operating cavity
L stator shell
I first power path
II second power path
S center of gravity distance as a function of the order q of the exciting vibration of the drive
M mass
$S_{eff}$ effective center of gravity distance
p oil density
r effective radius of inertial mass
$l_{eff}$ effective radius of the center of gravity path
$L_{eff}$ effective radius of the center of the center gravity path

What is claimed is:

1. A force transmission device for power transmission between an input and an output, comprising:

at least an input (E) and an output (A); and a vibration damping device disposed in a cavity that can be filled at least partially with an operating medium, the vibration damping device coupled with a rotational speed adaptive absorber, wherein the rotational speed adaptive absorber is tuned as a function of an oil influence to an effective order $q_{eff}$, which is greater by an order shift value $q_F$ than an order q of an exciting vibration of a drive system.

2. The force transmission device according to claim 1, wherein the order shift value $q_F$ is selected, so that a resonance of the rotational speed adaptive absorber does not coincide with the order q of the exciting vibration.

3. The force transmission device according to claim 1, wherein the effective order $q_{eff}$ of the rotational speed adaptive absorber exceeds the order q of the exciting vibration of the drive by the order shift value $q_F$ in the range of >0.05 to 0.5.

4. The force transmission device according to claim 1, wherein the rotational speed adaptive absorber is configured as a centrifugal force pendulum device, comprising an inertial mass support device with inertial masses disposed thereon and movable relative thereto, configured and designed, so that a center of gravity distance S of a particular inertial mass is determined as a function of an order q of the exciting vibration of the drive and the order shift by $q_F$ to an effective order $q_{eff}$ defines a change of the center of gravity distance as a function of the order shift value $q_F$.

5. The force transmission device according to claim 1, wherein a size of the order shift value $q_F$ changes proportional to a change of the order q of the excitation of the drive.

6. The force transmission device according to claim 1, comprising a hydrodynamic component with at least a primary shell functioning as a pump shell (P) and a secondary shell functioning as turbine shell (T) jointly forming an operating space (AR), wherein the turbine shell (T) is connected at least indirectly torque proof with the output (A) of the force transmission device and a device for bridging the hydrodynamic components, which are respectively disposed in a power path, and the device for damping vibrations is connected with the rotational speed adaptive absorber at least in series with one of the power paths, wherein a cavity which can be at least partially filled with an operating medium, is formed by an inner cavity of the force transmission device which inner cavity is flowed through by the operating medium of the hydrodynamic component.

7. The device of claim 1, wherein the operating medium is oil.

8. The force transmission device according to claim 1, wherein the effective order $q_{eff}$ of the rotational speed adaptive absorber exceeds the order q of the exciting vibration of the drive by the order shift value $q_F$ in the range of >0.05 to 0.4.

9. The force transmission device according to claim 1, wherein the effective order $q_{eff}$ of the rotational speed adaptive absorber exceeds the order q of the exciting vibration of the drive by the order shift value $q_F$ in the range of >0.05 to 0.3.

10. The force transmission device according to claim 1, wherein the effective order $q_{eff}$ of the rotational speed adaptive absorber exceeds the order q of the exciting vibration of the drive by the order shift value $q_F$ in the range of >0.14 to 0.3.

11. A method for improving the damping properties of a force transmission device for power transmission between an input and an output, comprising at least an input (E) and an output (A), and a vibration damping device disposed in a cavity that can be filled at least partially with an operating medium, the cavity in particular flowed through by an operating medium of a hydrodynamic component, the vibration damping device coupled with a rotational speed adaptive absorber, wherein the rotational speed adaptive absorber is tuned as a function of an oil influence to an effective order $q_{eff}$, which is greater by an order shift value $q_F$ than an order q of an exciting vibration of a drive system.

12. The method for improving the damping properties of a force transmission device according the claim 11, comprising the following method steps:

determining the order of excitation q of a drive engine;

defining a geometry of the rotational speed adaptive absorber for the order of excitation q;

determining the required order shift value $q_F$; and determining the geometry of the absorber as a function of the order shift value $q_F$.

13. The method of claim 11, wherein the operating medium is oil.

* * * * *

US008161740C1

(12) EX PARTE REEXAMINATION CERTIFICATE (10358th)

United States Patent
Krause et al.

(10) Number: US 8,161,740 C1
(45) Certificate Issued: Oct. 23, 2014

(54) FORCE TRANSMISSION DEVICE WITH A ROTATIONAL SPEED ADAPTIVE DAMPER AND METHOD FOR IMPROVING THE DAMPING PROPERTIES (75) Inventors: Thorsten Krause, Bühl (DE); Dominique Engelmann, Offendorf (FR)

(73) Assignee: Schaeffler Technologies AG & Co. KG, Herzogenaurach (DE)

Reexamination Request:
No. 90/013,199, Apr. 3, 2014

Reexamination Certificate for:
Patent No.: 8,161,740
Issued: Apr. 24, 2012
Appl. No.: 12/800,961
Filed: May 26, 2010

Related U.S. Application Data (63) Continuation of application No. PCT/DE2008/001901, filed on Nov. 17, 2008.

(30) Foreign Application Priority Data

Nov. 29, 2007 (DE) .......................... 10 2007 057 447

(51) Int. Cl.
*F16D 43/18* (2006.01)
*F16F 15/14* (2006.01)

(52) U.S. Cl.
USPC ............................ 60/338; 192/30 V; 188/378

(58) Field of Classification Search
USPC ........................................... 60/338; 192/30 V
See application file for complete search history.

(56) References Cited

To view the complete listing of prior art documents cited during the proceeding for Reexamination Control Number 90/013,199, please refer to the USPTO's public Patent Application Information Retrieval (PAIR) system under the Display References tab.

*Primary Examiner* — Matthew C. Graham (57) ABSTRACT

The invention relates to a force transmission device for power transmission between an input and an output, comprising at least an input and an output, and a vibration damping device disposed in a cavity that can be filled at least partially with an operating medium, in particular oil, the vibration damping device coupled with a rotational speed adaptive absorber, wherein the rotational speed adaptive absorber is tuned as a function of an oil influence to an effective order $q_{eff}$, which is greater by an order shift value $q_F$ than an order q of an exciting vibration of a drive system.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-13 is confirmed.

\* \* \* \* \*

(12) INTER PARTES REVIEW CERTIFICATE (1320th)
United States Patent (10) Number: US 8,161,740 K1
Krause et al. (45) Certificate Issued: Aug. 20, 2019

(54) FORCE TRANSMISSION DEVICE WITH A ROTATIONAL SPEED ADAPTIVE DAMPER AND METHOD FOR IMPROVING THE DAMPING PROPERTIES

(75) Inventors: Thorsten Krause; Dominique Engelmann

(73) Assignee: SCHAEFFLER TECHNOLOGIES AG & CO. KG

Trial Number:

IPR2016-00502 filed Jan. 26, 2016

Inter Partes Review Certificate for:

Patent No.: 8,161,740
Issued: Apr. 24, 2012
Appl. No.: 12/800,961
Filed: May 26, 2010

The results of IPR2016-00502 are reflected in this inter partes review certificate under 35 U.S.C. 318(b).

INTER PARTES REVIEW CERTIFICATE
U.S. Patent 8,161,740 K1
Trial No. IPR2016-00502
Certificate Issued Aug. 20, 2019

AS A RESULT OF THE INTER PARTES REVIEW PROCEEDING, IT HAS BEEN DETERMINED THAT:

Claims 1-13 are cancelled.

19. (substitute for claims 1-10) A force transmission device, comprised of a torque converter, for power transmission between an input and an output, comprising:
  at least an input (E) and an output (A);
  a lock-up clutch; and
  a vibration damping device disposed in a cavity that can be filled at least partially with an operating medium, the vibration damping device coupled with a rotational speed adaptive absorber in the form of a centrifugal force pendulum, the rotational speed adaptive absorber being positioned after the vibration damping device in the force flow direction,
  wherein the rotational speed adaptive absorber is tuned as a function of an oil influence to an effective order $q_{\mathit{eff}}$ which is greater by an order shift value $q_F$, than an order $q$ of an exciting vibration of a drive system,
  wherein the operating medium is oil and the oil influence is that of rotating oil in the cavity, which is flowed through with oil, on an inertial mass of the rotational speed adaptive absorber,
  wherein the effective order $q_{\mathit{eff}}$ of the rotational speed adaptive absorber exceeds the order $q$ of the exciting vibration of the drive system by the order shift value $q_F$ in the range of >0.05 to 0.5, and
  wherein the order shift value $q_F$ is approximately 0.14, and the order $q$ of the exciting vibration is 2.0.

25. (substitute for claims 11-13) A method for improving the damping properties of a force transmission device, comprised of a torque converter, for power transmission between an input and an output., comprising at least an input (E) and an output (A),
  a lock-up clutch; and
  a vibration damping device disposed in a cavity that can be filled at least partially with an operating medium, the cavity in particular flowed through by an operating medium of a hydrodynamic component, the vibration damping device coupled with a rotational speed adaptive absorber, in the form of a centrifugal force pendulum, wherein the rotational speed adaptive absorber is tuned as a function of an oil influence to an effective order $q_{\mathit{eff}}$ which is greater by an order shift value $q_F$ than an order $q$ of an exciting vibration of a drive system,
  wherein the rotational speed adaptive absorber is positioned after the vibration damping device in the force flow direction,
  wherein the operating medium is oil and the oil influence is that of rotating oil in the cavity on an inertial mass of the rotational speed adaptive absorber,
  wherein the method makes the effective order $q_{\mathit{eff}}$ of the rotational speed adaptive absorber exceed the order $q$ of the exciting vibration of the drive system by the order shift value $q_F$ in the range of >0.05 to 0.5, and
  wherein the order shift value $q_F$ is approximately 0.14, and the order $q$ of the exciting vibration is 2.0.

\* \* \* \* \*